(12) United States Patent
Kehoe et al.

(10) Patent No.: US 12,532,866 B2
(45) Date of Patent: Jan. 27, 2026

(54) ADHESIVE PATCH WITH FILM OVERLAY FOR THE APPLICATION AND CONTAINMENT OF SOLUBLE OR LESS VISCOUS MATERIALS ON SKIN

(71) Applicant: WiSys Technology Foundation, Inc., Madison, WI (US)

(72) Inventors: Sylvia Kehoe, Hudson, WI (US); John Obielodan, Platteville, WI (US)

(73) Assignee: WiSys Technology Foundation, Inc., Madison, WI (US)

( * ) Notice: Subject to any disclaimer, the term of this patent is extended or adjusted under 35 U.S.C. 154(b) by 210 days.

(21) Appl. No.: 18/275,736

(22) PCT Filed: Feb. 9, 2022

(86) PCT No.: PCT/US2022/015742
§ 371 (c)(1),
(2) Date: Aug. 3, 2023

(87) PCT Pub. No.: WO2022/173781
PCT Pub. Date: Aug. 18, 2022

(65) Prior Publication Data
US 2024/0292814 A1    Sep. 5, 2024

Related U.S. Application Data

(60) Provisional application No. 63/147,335, filed on Feb. 9, 2021.

(51) Int. Cl.
*A01K 17/00*    (2006.01)
*A61D 7/00*    (2006.01)
*A61D 9/00*    (2006.01)

(52) U.S. Cl.
CPC ............... *A01K 17/00* (2013.01); *A61D 7/00* (2013.01); *A61D 9/00* (2013.01)

(58) Field of Classification Search
CPC ............ A01K 17/00; A61D 7/00; A61D 9/00
See application file for complete search history.

(56) References Cited

U.S. PATENT DOCUMENTS

| 4,158,359 A | 6/1979 | Kurokawa et al. |
| 4,788,971 A * | 12/1988 | Quisno ............... A61B 10/0035 600/556 |
| 5,108,710 A | 4/1992 | Little et al. |
| (Continued) | | |

FOREIGN PATENT DOCUMENTS

| KR | 100898730 | 5/2009 |
| WO | 0076305 A1 | 12/2000 |

OTHER PUBLICATIONS

European Supplementary Search Report for Application No. 22753230.6.

*Primary Examiner* — Vi X Nguyen
(74) *Attorney, Agent, or Firm* — Boyle Fredrickson, S.C.

(57) ABSTRACT

A caustic paste applicator provides a self-contained adhesive patch that supports a ring of adhesive that is adhered to the calf's skin around the horn bud and an inner spot or dab of caustic paste that is applied over the horn bud to contact the horn bud. The patch shields the caustic paste from spreading and allows the adhesive to be used in conjunction with the caustic paste in a manner which does not cause the patch to lose its stickiness.

14 Claims, 3 Drawing Sheets

(56) References Cited

U.S. PATENT DOCUMENTS

| | | | |
|---|---|---|---|
| 6,006,697 A * | 12/1999 | Sullwold | A01K 17/00 606/163 |
| 2002/0026124 A1 | 2/2002 | Whitaker | |
| 2006/0105029 A1 | 5/2006 | Zhang et al. | |
| 2019/0247278 A1* | 8/2019 | Gitman | A61J 1/2055 |

* cited by examiner

ADHESIVE PATCH WITH FILM OVERLAY FOR THE APPLICATION AND CONTAINMENT OF SOLUBLE OR LESS VISCOUS MATERIALS ON SKIN

CROSS REFERENCE TO RELATED APPLICATION

This application claims the benefit of U.S. Provisional Patent Application No. 63/147,335, filed Feb. 9, 2021, which is incorporated by reference herein in its entirety.

BACKGROUND OF THE INVENTION

The present invention relates generally to dehorning or disbudding livestock and, in particular, to an applicator that is used to apply caustic paste for disbudding calves with significant reduction of secondary exposure of the caustic paste to the calves and their handlers.

Livestock dehorning to cattle, sheep, and goats is generally desired to prevent injury to animals and their handlers. There are also economic reasons for dehorning, for example, horned animals take up more space causing issues at the feed bunk and during transportation; horned animals require specialized equipment, such as feeders and angulate crushes; horns may become broken causing blood loss and infection; and horned animals may become trapped in fences or vegetation, causing self-injury to the animal. The dehorning process is generally desirable at an early age of the livestock so that the process is less invasive and less painful to the animal.

It is recommended that the livestock be dehorned at the earliest age practicable. If the horn removal process is done early enough, a process called disbudding can be performed which cauterizes and destroys the horn buds before they have attached to the skull and grow as an extension of the skull. Once the horn is attached to the skull, part of the tender sinus above the eyes merges with the horn, making disbudding no longer an option. The disbudding process for calves will now be generally described.

At an early age, for example, when calves are less than two months of age, the calves' horn buds are still free-floating and are not yet attached to the frontal bone of the skull. The calves' horns can be disbudded by removing horn-producing cells of the horn buds using a caustic paste, a hot iron, or by physically excising the cells using a sharp knife, tube, cup, or spoon.

The application of caustic paste may be preferred over other disbudding methods because it is bloodless, non-invasive, less painful to the calf, and subjects less risk of injury to the calf handler. However, following the application of caustic paste, the calf cannot be exposed to rain or allowed near other animals for at least six hours following application. Exposure to rain can result in the caustic paste running into the calves' eyes causing burns and irritation. Also, caustic paste that is exposed to the environment might be transferred to the enclosure, equipment, and other animals (i.e., "secondary exposure"), causing additional harm.

SUMMARY OF THE INVENTION

Cattle handlers have attempted to solve spreading and transfer problems by using an adhesive tape over the caustic paste or petroleum jelly around the horn bud to prevent the secondary transfer of caustic paste to other objects or animals (i.e., "secondary exposure"). However, the adhesive tape easily falls off the calf and the petroleum jelly is prone to smear with the caustic paste.

The present invention provides a caustic paste applicator that is a self-contained adhesive patch that supports a ring of adhesive that is adhered to the calf's skin around the horn bud and an inner spot or dab of caustic paste that is applied over the horn bud to contact the horn bud. The patch shields the caustic paste from the environment and allows the adhesive to be used in conjunction with the caustic paste in a manner which does not cause the patch to lose its stickiness.

It is thus one feature of one embodiment of the present invention to shield the caustic paste from secondary exposure.

It is thus one feature of one embodiment of the present invention to limit the area of application to the area of the horn bud protecting the surrounding skin of the calf from unnecessary chemical burn.

It is thus one feature of one embodiment of the present invention to provide a single step application of a protective layer and a caustic paste that prevents the spreading or smearing of the caustic paste.

In one embodiment of the present invention, an applicator for application of caustic paste to horn buds of a calf comprises a substrate having an upper surface opposite a lower surface and further supporting an upwardly extending cap holding a cap volume accessible through an opening on the lower surface, the cap volume configured to hold an amount of caustic paste; a spacer comprising a non-adhesive material supported on the lower surface and surrounding the elevated cap, the spacer having an inner diameter of at least 1 inch and width between 0.3 inch and 1 inch; and an adhesive supported on the lower surface and surrounding the spacer.

It is thus one feature of one embodiment of the present invention to apply caustic dehorning paste to a calf's horn buds without unwanted transfer of the dehorning paste to other areas on the calf's body and/or the environment.

The opening of the cap may have an outer dimension between 0.2 inch to 1 inch and the cap volume may be at least 0.04 cubic inches.

It is thus one feature of one embodiment of the present invention to support a sufficient amount of caustic dehorning paste onto the horn buds required to cause chemical dehorning.

The adhesive ring may have an inner diameter between 1 and 2 inches.

It is thus one feature of one embodiment of the present invention to apply an adhesive patch encircling the size of an average calf's horn buds.

The adhesive ring may have a width between 0.3 and 1 inches.

It is thus one feature of one embodiment of the present invention to provide enough adhesive to ensure strong bond of the applicator patch to the calf.

The adhesive substate may be an adhesive glue selected from the group consisting of a rubber-based adhesive and an acrylic-based adhesive.

It is thus one feature of one embodiment of the present invention to provide strong bond of the patch to the calf that is resistant to water exposure but which may be removed without excessive pain to the calf.

The spacer may be an absorbent material.

It is thus one feature of one embodiment of the present invention to provide a spacer between the caustic paste and the adhesive that may be able to absorb caustic paste that "bleeds out" from the cap's circumference.

The spacer may be a rubber material.

It is thus one feature of one embodiment of the present invention to seal the patch to the skin of the calf to prevent movement of caustic paste outward and keep the caustic paste contained to an area on or over the horn buds only.

The substrate may be a circular patch.

It is thus one feature of one embodiment of the present invention to allow the patch to provide intuitive application to the horn buds and to completely cover the horn buds with an area of the patches.

The substrate may be selected from the group consisting of woven fabric, plastic, and latex.

It is thus one feature of one embodiment of the present invention to provide a flexible and water resistant substrate that can withstand repeated bending and exposure to the environment.

An area of the substrate may be at least 50% greater than an area of the horn buds.

It is thus one feature of one embodiment of the present invention to provide adhesion of the patch around the horn buds.

The substrate may further comprise an outwardly extending tab protruding from an edge of the substrate.

It is thus one feature of one embodiment of the present invention to allow for easy removal of the patch without the user having to contact the paste.

The applicator may further comprise a backing sheet extending over the lower surface of the substrate. The backing sheet may be selected from the group consisting of a wax coated paper and a plastic sheet.

It is thus one feature of one embodiment of the present invention to allow the patches to be prepared with the caustic paste filled within the cap of the patch, and to allow the patches to be "ready to use" at the application site by removing the backing.

The upwardly extending cap may have selectively exposable aeration holes permitting aeration of the caustic paste to the atmosphere.

An alternative embodiment of the present invention provides a method of disbudding a calf comprising the following steps: restraining the calf and immobilizing a head of the calf; locating the horn buds of the head of the calf; trimming the hair on and around the horn buds of the head of the calf; and applying a substrate over the horn buds of the head of the calf. The substrate may comprise an upwardly extending cap holding a cap volume accessible through an opening on a lower surface of the substrate, the cap volume configured to hold an amount of caustic paste; a spacer comprising a non-adhesive material supported on the lower surface and surrounding the cap, the spacer having a width between 0.3 inch and 1 inch; and an adhesive supported on the lower surface and surrounding the spacer.

It is thus one feature of one embodiment of the present invention to provide a method of applying dehorning paste to a calf that reduces secondary exposure of the caustic paste.

The method may further comprise contacting the caustic paste and horn bud to cause a chemical burn.

The method may further comprise applying the substrate on the horn buds for at least six hours. The method may further comprise removing the substrate from the horn buds.

The method may further comprise exposing aeration holes in the cap to vent the caustic paste to the atmosphere.

These particular objects and advantages may apply to only some embodiments falling within the claims and thus do not define the scope of the invention.

DETAILED DESCRIPTION OF THE PREFERRED EMBODIMENT

Figures 1, 2:
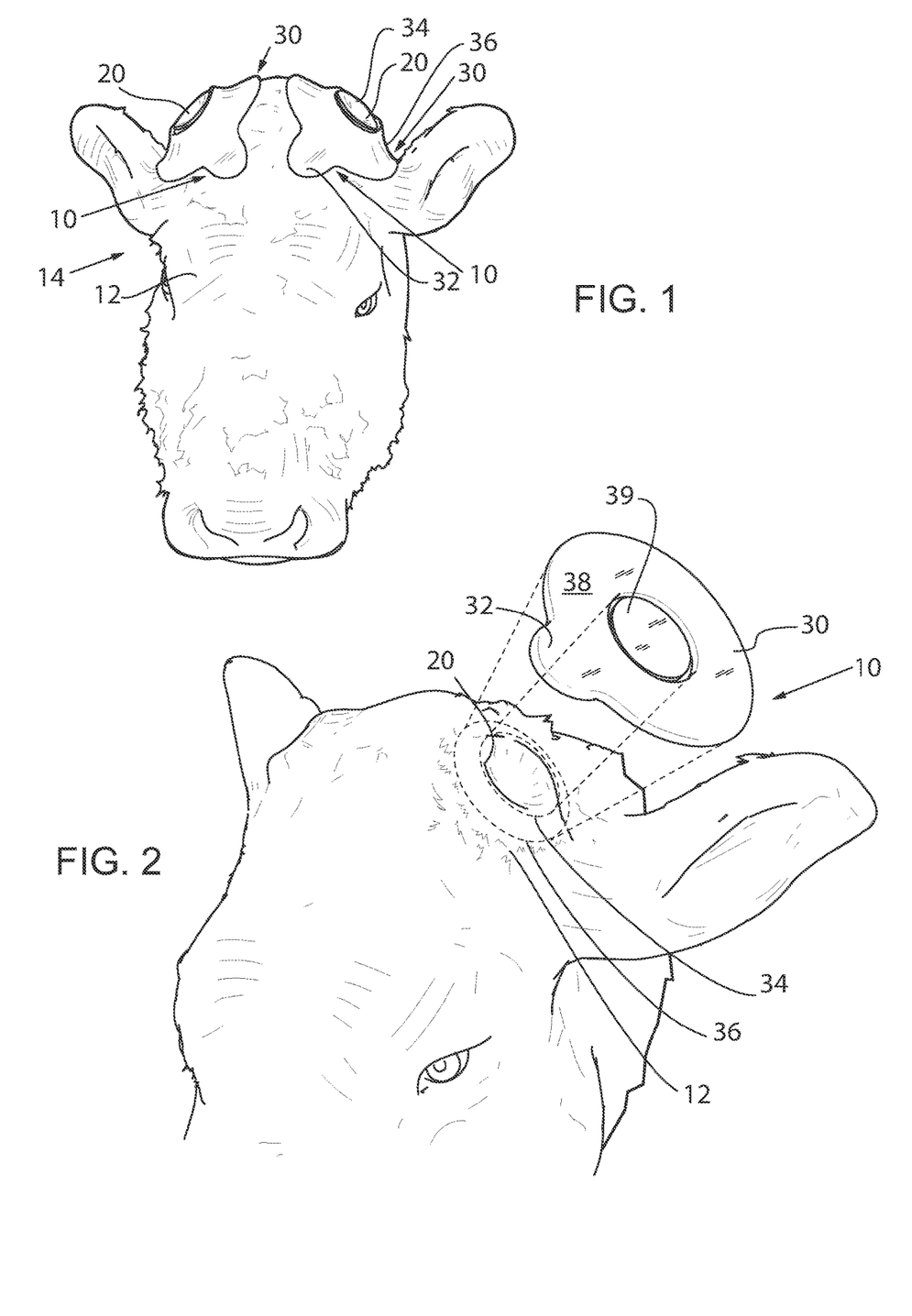
FIG. 1 is a perspective view of a calf's head with the caustic dehorning paste applicator of the present invention applied and stuck to the calf's head over its horn buds.
FIG. 2 is an exploded view of the caustic paste applicator of FIG. 1 showing the patch of the applicator being applied to the calf's skin around the horn buds and having a center spot of caustic dehorning paste contacting the horn bud thereafter causing a chemical burn.

Referring to FIG. 1, a caustic paste applicator 10 of the present invention may be used with a dehorning caustic paste 16 and applied to the head 12 of a calf 14 to dehorn or specifically disbud the calf 12 less invasively. As used herein, the term "dehorning" may be used to generally describe the disbudding process of calves by using caustic paste to prevent horn growth.

Generally, the age of the calf 14 is under two months old, and preferably under two days old, when the caustic paste applicator 10 is applied to the horn buds 20 of the calf 14 in order to ensure the effectiveness of the caustic paste 16 of the caustic paste applicator 10 and to minimize the pain and discomfort to the animal. It is understood that a calf 14 of this young age will have free-floating horn buds 20 that are not yet attached to the frontal bone of the skull, making disbudding possible before the horn buds 20 have attached to the skull and before they have grown into horns.

Figure 6:
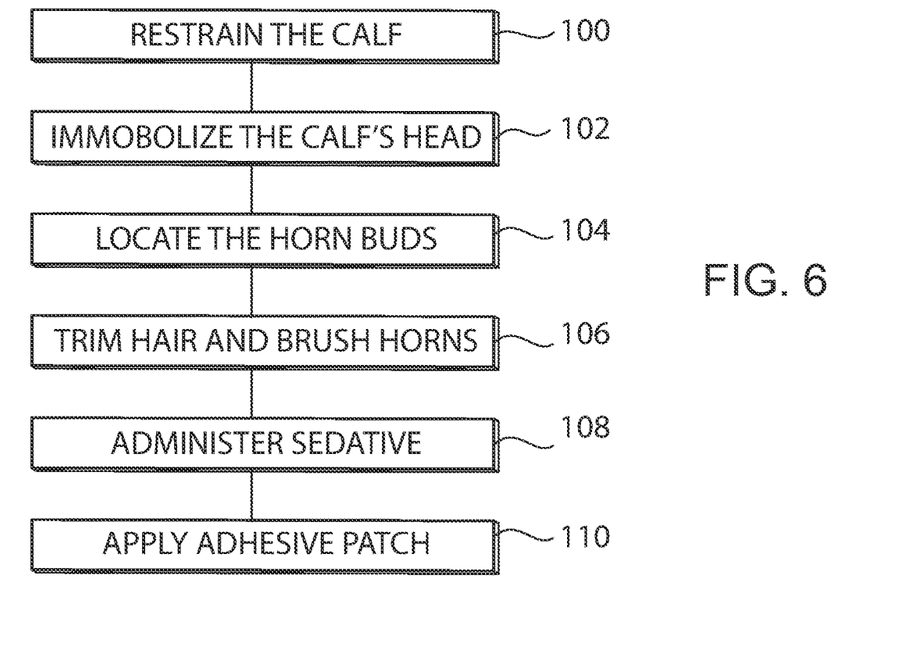
FIG. 6 is a flow chart providing the general steps for preparing a calf for disbudding using the caustic dehorning paste applicator of FIG. 1 and in accordance with the present invention.

Referring also to FIG. 6, the disbudding process may involve several preliminary steps to prepare the calf 14 prior to the application of the caustic paste 16. Initially, the calf 14 may be restrained by placing the calf 14 within a restraining chute as indicated by block 100. The restraining chute may provide a metal cage that is composed of vertically extending metal tubes. The restraining chute may include a space between the metal tubes that the calf's head 12 can fit therebetween and then firmly held in place. An alternative to restraining the calf 14 using a restraining chute is to administer a sedative, e.g., an alpha-2 agonist such as Xylazine, which assists with sedating the calf 14 and laying the calf 14 on the ground. The calf's head 12 may be then immobilized using the handler's hands, arms and/or legs as indicated by block 102.

The operator may then locate the calf's horn buds 20 on the head 12 of the calf 14 by manually feeling the skin of the calf 14 as indicated by block 104. Once the horn buds 20 are located, the hair on and around the horn buds 20 is shaved or trimmed away from the skin of the calf 14 as indicated by block 106. The horn buds 20 are then lightly brushed with a small wire brush or the like to clean and roughen the horn buds 20 as also indicated by block 106.

A local anesthesia, e.g., lidocaine, may be optionally injected into the base of the horn buds 20 to numb the horn bud area and reduce pain to the calf 14 with the application of the caustic paste 16 as indicated by block 108.

The calf 14 is thereby prepped to receive the applicator 10 of the present invention as indicated by block 110, and as further described below with respect to FIGS. 2 and 3.

Figure 3:
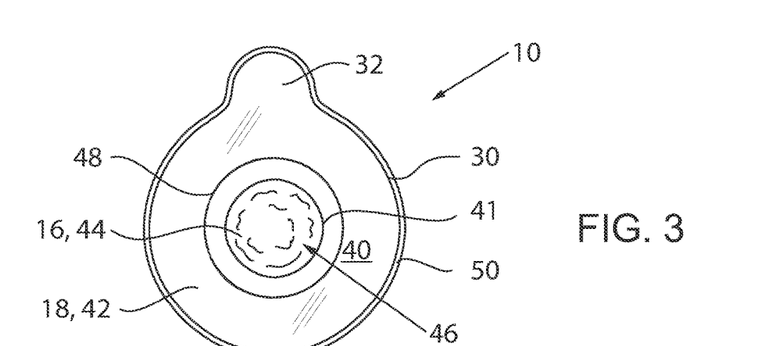
FIG. 3 is a bottom plan view of the patch of FIG. 2 showing the patch containing a ring of adhesive surrounding the center spot of caustic dehorning paste and a removable protective film overlaying the adhesive and paste before application of the patch.

Referring now to FIGS. 2 and 3, the applicator 10 of the present invention may include a pair of patches 30 applied to each horn bud 20 of the calf 14, each patch 30 comprising a substrate that is generally circular in form to be applied over each of the circular horn buds 20, respectively, of the calf 14. The patch 30 may support an adhesive 18 for adhering the patch 30 to the calf's head 12 and caustic paste 16 for disbudding the calf 14 as further described below.

The patch 30 of the applicator 10 may be a circular sheet of woven fabric, plastic (PVC, polyethylene or polyurethane) or latex sheet, and the like. The patch 30 may be a generally flexible and water resistant material so that the patch 30 can be retained on the calf's head for an extended period of time.

The area 34 of the horn bud 20 may be a circular area that is about 0.25 to 1 inch in diameter. An immediately surrounding skin area 36 surrounding the horn bud 20 may be a circular area with hair removed that is about 1 to 4 inches in diameter.

In one embodiment of the present invention, the patch 30 may cover an area that is at least 50% greater and at least 70% greater and at least 80% greater and at least 90% greater than an area 34 of the horn bud 20 alone to extend into the surrounding skin area 36. In one embodiment, the patch 30 is approximately 1 to 4 inches in diameter and at least 1.25 inches and at least 3 inches in diameter in order to cover an entire area 34 of the horn bud 20 and to further adhere to the immediately surrounding skin area 36 surrounding the horn bud 20.

It is understood that the patch 30 may be circular in shape to correspond with the shape of the horn bud 20 but the patch 30 may be other shapes, such as oval, rectangular, and the like, and sized so that the patch 30 is larger than and completely covers the horn bud 20 and extends into the surrounding skin area 36.

The patch 30 may further support an outwardly extending lift tab 32 which assists with easy removal of the patch 30 from the head 12 of the calf 14 by lifting the lift tab 32 using one's fingers. The lift tab 32 may be generally semi-circular in shape and is attached to and extends outwardly from an outer edge of the circular patch 30. The outwardly extending lift tab 32 does not stick to the head 12 of the calf 14.

As seen in FIG. 2, an upper surface 38 of the patch 30 may provide a generally planar surface apart from a circular cap 39 projecting upwardly from the patch 30. The circular cap 39 is positioned about an approximate center of the upper surface 38 and extends approximately a height of about 0.05 to 0.07 inches. The circular cap 39 corresponds to a cap volume 46 accessible from a lower surface 40, as seen in FIG. 3, and receiving the caustic paste 16 to be filled therein as further described below.

Now referring to FIG. 3, the lower surface 40 of the patch 30, opposite the upper surface 38, may support a small amount or dab 44 of caustic paste 16 held within the cap volume 46 of the circular cap 39 of the patch 30. The cap volume 46 is accessible through an opening 41 on the lower surface 40 of the patch 30 and permitting a sufficient amount of caustic paste 16 to be filled within the cap volume 46 of the circular cap 39 and supported by the patch 30.

The cap volume 46 may have a circular cross sectional diameter between 0.2 and 1 inch and a cross sectional area between 0.2 inches$^2$ and 0.8 inches$^2$ in order to cover a corresponding area 34 of the receiving horn bud 20. The circular cap 39 may be approximately 0.05 inches to 0.1 inches in height and at least 0.05 inches in height and at least 0.07 inches in height to hold a sufficient amount of caustic paste 16.

The cap volume 46 may be at least 0.04 cubic inches and at least 0.05 cubic inches. The cap volume 46 provides a cap inner space that may be filled with the caustic paste 16 to apply an amount of at least 0.04 cubic inches and at least 0.05 cubic inches of caustic paste 16 (or an amount about the size of a nickel for younger calves or a quarter for older calves) onto the horn bud 20.

The caustic paste 16 may contain a mixture of caustic substances, e.g., calcium hydroxide and sodium hydroxide, that when applied to the horn bud 20 causes a chemical burn that destroys the horn-producing cells. The caustic paste 16 may be a commercially available product, e.g., sold under the trade name Dr. Naylor Dehorning Paste, Dr. Larson Dehorning Paste and the like.

The patch 30 may be held to the horn bud 30 by an outer ring 42 of an adhesive 18. The adhesive 18 can stick strongly to the skin of the calf 14 without falling off easily and without leaving residue when removed. The adhesive 18 forming the outer ring 42 may be a rubber-based adhesive, acrylic based adhesive, and the like. In one embodiment of the present invention, the adhesive 18 may be similar to an adhesive glue found on duct tape.

The outer ring 42 may have an outer diameter that is generally the same or slightly smaller than the outer diameter of the patch 30. The outer ring 42 may have an inner diameter that is large enough to surround the horn bud 20 of the calf 14. The outer ring 42 may have an inner diameter between 1 and 2 inches and at least 1 inch and at least 1.5 inches, and an outer diameter between 3 and 4 inches, and at least 3 inches and at least 3.5 inches. The width of the outer ring 42, spanning a distance between the inner diameter and outer diameter of the outer ring 42, may be between 0.3 to 1 inch.

The dab 44 of caustic paste 16 may be spaced from the outer ring 42 by a spacer ring 48 preventing the caustic paste 16 from directly contacting the adhesive 18 on the preformed patch 30 and allowing the caustic paste 16 to spread out or "bleed out" from a circumference of the opening 41 of the circular cap 39 and into the spacer ring 48 once the patch 30 is applied to the horn buds 20 without contacting the outer ring 42 of adhesive 18.

In one embodiment of the present invention, the spacer ring 48 is an absorbent material that will absorb the caustic paste 16 bleeding out from the circumference of the opening 41 of the circular cap 39. For example, the spacer ring 48 may be an absorbent gauze made of cotton with a thin, porous-polymer coating. In an alternative embodiment of the present invention, the spacer ring 48 may be a blocking material that will block the caustic paste 16 from bleeding out from the circumference of the opening 41 of the circular cap 39. For example, the spacer ring 48 may be a rubber seal or rubber gasket. Generally, the spacer ring 48 assists with preventing the caustic paste 16 from contacting the adhesive 18 prior to and after application of the patch 30 and thus reducing the adhesion of the patch 30.

The spacer ring 48 may have an inner diameter between 0.5 and 1 inch and at least 0.5 inches and at least 0.75 inches, and an outer diameter between 1 and 2 inches and at least 1 inch and at least 1.5 inch. The width of the spacer ring 48, spanning a distance between the inner diameter and outer diameter of the spacer ring 48 may be between 0.5 and 1.5 inches.

The lower surface 40 of the patch 30 may be overlaid by a removeable backing sheet 50 which may be a coated paper or plastic sheet, e.g., a clear plastic sheet, that contacts the outer ring 42 of adhesive 18 and dab 44 of caustic paste 16 preventing the adhesive 18 and caustic paste 16 from contacting or sticking to anything before application. The backing sheet 50 is removable by peeling off the backing sheet 50 when the patch 30 is ready to be applied over the horn bud 20.

The backing sheet 50 may be slightly larger than the lower surface 40 of the patch 30 so that an entire area of the lower surface 40 is protected by the backing sheet 50 and so that the backing sheet 50 may be easily removed from the patch 30 by hand. The backing sheet 50 may conform to the circular shape of the patch 30 or may be any shape which encompasses the patch 30, for example, a rectangular sheet of material.

Figure 4:
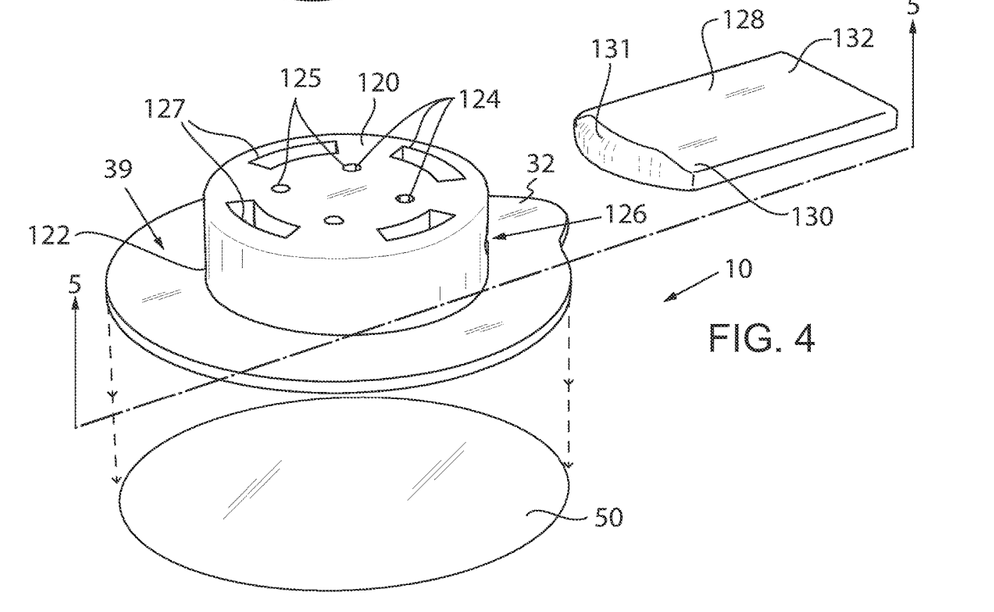
FIG. 4 is an exploded view of an alternative embodiment of the caustic paste application of FIG. 1 showing the patch of the applicator having an aeration cover with holes that can be selectively opened and closed by a removable tab to provide aeration to the caustic dehorning paste.
Figure 5:
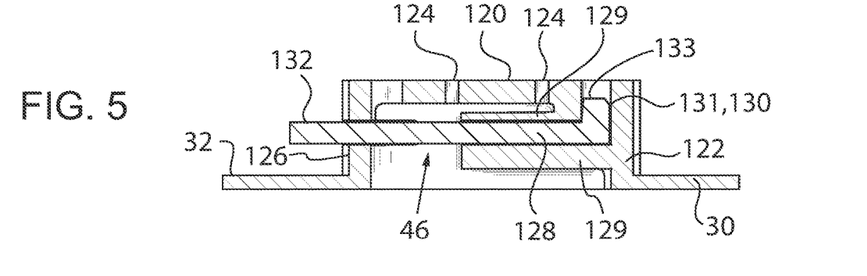
FIG. 5 is a cross section taken along line 5-5 of FIG. 4 showing the removable tab inserted into the slit of the aeration cap.

Referring now to FIGS. 4 and 5, an alternative embodiment of the present invention is similar to the patch 30 of FIGS. 2 and 3, but the circular cap 39 may include an aeration cover 120 over a cylindrical drum 122. The aeration cover 120 contains hole openings 124 that permit the caustic paste 16 held within the cylindrical drum 122 to be selectively exposed to air. The hole openings 124 may take the form of a plurality of circular holes 125, for example, five circular holes arranged in a circular formation, and surrounded by arch shaped holes 127, for example, four arch shaped holes arranged in a circular formation and surrounding the five circular holes.

A slit 126 may be formed within the cylindrical drum 122 below the aeration cover 120 permitting the insertion of a hole blocking tab 128 along a plane of the aeration cover 120 to block the hole openings 124 of the aeration cover 120, for example, before the patch 30 is applied over the horn bud 20. The slit 126 may include supports or brackets 129 for supporting the hole blocking tab 128 thereon or therebetween the brackets 129 and along the plane of the aeration cover 120.

The hole blocking tab 128 may be shaped and sized to completely block the hole openings 124 when slid within the slit 126 and supported by the brackets 129. In one embodiment of the present invention, the hole blocking tab 128 may be oblong shaped with an insertion end 130 that sits below the aeration cover 120 and a tail end 132 that protrudes outward from the circular cap 39 and assists with removal, and optionally, reinsertion, of the hole blocking tab 128 into and out of the aeration cover 120 by manually pulling or pushing on the hole blocking tab 128 into and out of the slit 126.

In one embodiment of the invention, the insertion end 130 of the hole blocking tab 128 may include an upwardly extending end 131 that may correlate with a notch 133 within the slit 126 and receiving the upwardly extending end 131 and assisting with retaining the insertion end 130 of the hole blocking tab 128 within the slit 126 so that additional force is required to pull the tail end 132 of the hole blocking tab 128 outward from the notch 133 to prevent accidental removal of the hole blocking tab 128.

Removal of the hole blocking tab 128 from the circular cap 39 after the patch 30 is applied over the horn bud 20 may be accomplished by pulling the tail end 132 and pulling the hole blocking tab 128 outward from the slit 126. In this respect, the upwardly extending end 131 of the insertion end 130 may bend or flex downward to allow the hole blocking tab 128 to be released from the notch 133. In one embodiment of the invention, the aeration of the caustic paste 16 when the hole openings 124 are exposed to the atmosphere allows the chemical gases of the caustic paste 16 to circulate to the atmosphere.

Referring again to FIGS. 2 and 7, to apply the patch 30 to the horn bud 20 of the calf 14, the backing sheet 50 is removed from the lower surface 40 of the patch 30 to expose the outer ring 42 of adhesive 18 and dab 44 of caustic paste 16 as indicated by block 150. Once the lower surface 40 of the patch 30 is exposed, the patch 30 is centered over the horn bud 20 and applied onto the calf's head 12 so that the caustic paste 16 of the lower surface 40 contacts the area 34 of the horn bud 20 and the adhesive 18 of the lower surface 40 contacts the surrounding skin area 36 surrounding the horn bud 20 as indicated by block 152.

Figure 7:
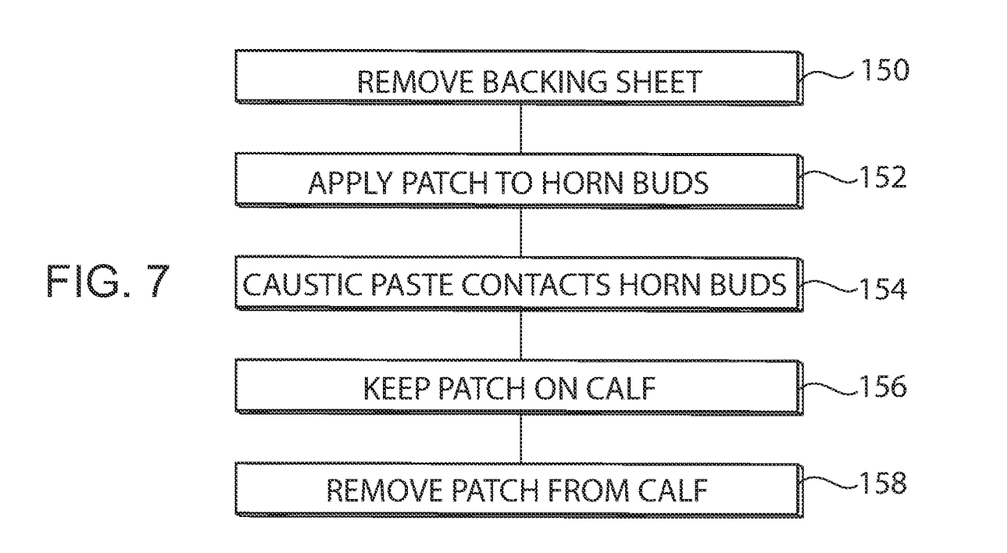
FIG. 7 is a flow chart providing the general steps for applying the adhesive patch on the calf for disbudding using the caustic dehorning paste applicator of FIG. 1 and in accordance with the present invention.

Once the patch 30 is applied, the caustic paste 16 contacts the horn bud 20 to cause a chemical burn that destroys the horn producing cells as indicated by block 154. The caustic paste 16 may spread out slightly within the area of the spacer ring 48 or inside the spacer ring 48 but without substantially spreading to the ring of adhesive 18. The calf 14 is then permitted to rest with the patch 30 remaining on the calf's head 12 for a predetermined amount of time as indicated by block 156.

It is understood that the upper surface 38 of the patch 30 shields the caustic paste 16 from the environment. However, optionally, and as described with respect to FIG. 4, the hole blocking tab 128 may be removed from the circular cap 39 to allow for venting of the caustic paste 16 through the hole openings 124 which are subsequently exposed to the atmosphere.

After approximately six hours of application, the patch 30 may be removed by lifting up the lift tab 32 by hand and removing the patch 30 from the calf's head 12 as indicated by block 158. Any excess caustic paste 16 may be wiped from the skin of the calf's head 12 to prevent secondary exposure.

It is understood that the caustic paste applicator 10 is described as being used with a dehorning paste, but it is understood that the caustic paste application 10 may be used to apply other paste substances where it is desired that the paste be retained within an area of application and does not bleed out of the patch or to the adhesive of the patch.

Certain terminology is used herein for purposes of reference only, and thus is not intended to be limiting. For example, terms such as "upper," "lower," "above," and "below," refer to directions in the drawings to which reference is made. Terms such as "front," "back," "rear," "bottom," and "side," describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second," and other such numerical terms referring to structures do not imply a sequence or order unless clearly indicated by the context.

When introducing elements or features of the present disclosure and the exemplary embodiments, the articles "a," "an," "the," and "said," are intended to mean that there are one or more of such elements or features. The terms "comprising", "including," and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. An applicator for application of caustic paste to horn buds of a calf during a dehorning procedure, the applicator comprising:
    a patch that is adapted to engage a head of a calf during a dehorning procedure, the patch including:
        a substrate having an outer perimeter, an upper surface opposite a lower surface defining a thickness therebetween, and an opening that extends through the substrate thickness and is positioned inwardly of the substrate outer perimeter;
        a cap providing an upwardly extending volume as a cap inner space that is adapted to hold a volume of caustic paste against a horn bud of the calf during the dehorning procedure;
        wherein the cap inner space is bounded by:
            a cap peripheral wall that extends about the substrate opening and away from the substrate in a direction that is opposite the calf head when the patch engages the calf head during the dehorning procedure, and
            a cap outer wall extending perpendicularly across the cap peripheral wall;
    an adhesive exposed on the substrate lower surface in a ring pattern of exposed adhesive that does not overlap and is radially spaced from the cap, wherein the adhesive is adapted to affix the patch to the head of the calf during the dehorning procedure; and
    a spacer comprising a ring-shaped body surrounding the substrate opening and arranged concentrically between the substrate opening and the ring pattern of exposed adhesive,
    wherein the ring-shaped body of the spacer:
        includes an inner perimeter adjacent the substrate opening;
        includes outer perimeter adjacent the exposed adhesive on the substrate lower surface; and
        comprises a non-adhesive material supported on the substrate lower surface as a blocking material configured to block the volume of caustic paste from flowing from the substrate opening to the exposed adhesive.

2. The applicator of claim 1 wherein the cap has a width dimension between 0.2 inch to 1 inch and a volume of at least 0.04 cubic inches.

3. The applicator of claim 1 wherein the ring pattern of the adhesive defines an inner diameter between 1 and 2 inches.

4. The applicator of claim 3 wherein the ring pattern of the adhesive has a width measured between the inner diameter and an outer diameter between 0.3 and 1 inches.

5. The applicator of claim 3 wherein the adhesive is a glue selected from a group consisting of a rubber-based adhesive and an acrylic-based adhesive.

6. The application of claim 3 wherein the spacer is a rubber material.

7. The applicator of claim 1 wherein the substrate outer perimeter defines a circular perimeter shape.

8. The applicator of claim 1 wherein the substrate is selected from a group consisting of woven fabric, plastic, and latex.

9. The applicator of claim 1 wherein an area of the substrate is at least 50% greater than an area of the respective horn bud of the calf.

10. The applicator of claim 1 wherein the substrate further comprises an outwardly extending tab protruding from an edge of the substrate and is adapted to not stick to the head of the calf during the dehorning procedure.

11. The applicator of claim 1 further comprising a backing sheet extending over the lower surface of the substrate.

12. The applicator of claim 11 wherein the backing sheet is selected from the group consisting of a wax coated paper and a plastic sheet.

13. The applicator of claim 1 wherein the cap has selectively exposable aeration holes permitting aeration of the caustic paste to atmosphere.

14. An applicator for application of caustic paste to horn buds of a calf during a dehorning procedure, the applicator comprising:
    a patch that is adapted of a calf during a dehorning procedure, the patch including:
        a substrate having an outer perimeter, an upper surface opposite a lower surface defining a thickness therebetween, and an opening that extends through the substrate thickness and is positioned inwardly of the substrate outer perimeter;
        a cap providing an upwardly extending volume as a cap inner space that is adapted to hold a volume of caustic paste against a horn bud of the calf during the dehorning procedure;
        wherein the cap inner space is bounded by:
            a cap peripheral wall that extends about the substrate opening and away from the substrate in a direction that is opposite the calf head when the patch engages the calf head during the dehorning procedure, and
            a cap outer wall extending perpendicularly across the cap peripheral wall;
    an adhesive exposed on the substrate lower surface in a ring pattern at does not overlap the cap,
    wherein:
        the adhesive is adapted to affix the patch to the head of the calf during the dehorning procedure;
        the ring pattern of the adhesive defines an inner diameter between 1 and 2 inches further including a spacer comprising an absorbent material and engaging the substrate lower surface between the adhesive and the substrate opening.

\* \* \* \* \*